US011644811B2

(12) United States Patent
Tang et al.

(10) Patent No.: US 11,644,811 B2
(45) Date of Patent: May 9, 2023

(54) ADAPTIVE PATH GENERATION FOR CNC MACHINING

(71) Applicant: FANUC CORPORATION, Yamanashi (JP)

(72) Inventors: Te Tang, Fremont, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 794 days.

(21) Appl. No.: 16/668,757

(22) Filed: Oct. 30, 2019

(65) Prior Publication Data

US 2021/0132568 A1    May 6, 2021

(51) Int. Cl.
*G05B 19/21* (2006.01)
*G05B 19/4097* (2006.01)

(52) U.S. Cl.
CPC ......... *G05B 19/21* (2013.01); *G05B 19/4097* (2013.01); *G05B 2219/35012* (2013.01); *G05B 2219/35107* (2013.01); *G05B 2219/40458* (2013.01)

(58) Field of Classification Search
None
See application file for complete search history.

(56) References Cited

U.S. PATENT DOCUMENTS 5,117,348 A * 5/1992 Romero ............... B29C 70/388
156/350
2018/0348730 A1* 12/2018 Reekmans ............ B25J 9/1671

FOREIGN PATENT DOCUMENTS

| CC | 103419540 A | 12/2013 |
| CN | 102865847 A | 1/2013 |
| CN | 103600615 A | 2/2014 |

* cited by examiner

*Primary Examiner* — Sean Shechtman
(74) *Attorney, Agent, or Firm* — John A. Miller; Shumaker, Loop & Kendrick, LLP

(57) ABSTRACT

A method and system for adapting a CNC machine tool path from a nominal workpiece shape to an actual workpiece shape. The method includes defining a grid of feature points on a nominal workpiece shape, where the feature points encompass an area around the machine tool path but do not necessarily include points on the machine tool path. A probe is used to detect locations of the feature points on an actual workpiece. A space mapping function is computed as a transformation from the nominal feature points to the actual feature points, and the function is applied to the nominal tool path to compute a new tool path. The new tool path is used by the CNC machine to operate on the actual workpiece. The feature points are used to characterize the three dimensional shape of the working surface of the actual workpiece, not just a curve or outline.

18 Claims, 5 Drawing Sheets

ADAPTIVE PATH GENERATION FOR CNC MACHINING

BACKGROUND

Field

This invention relates to the field of computing tool paths for Computer Numerical Control (CNC) machines and, more particularly, to a method for adapting a CNC machine tool path from a nominal workpiece shape to an actual workpiece shape which defines a grid of feature points on the nominal workpiece shape, measures locations of the feature points on the actual workpiece shape, and uses a space mapping function with the measured locations to transform the CNC machine path to the actual workpiece shape.

Discussion of the Related Art

Computer Numerical Control (CNC) machines—such as drills, lathes and milling machines—have been used for many years to automatically produce parts based on a Computer Aided Design (CAD) file which defines the part shape. CNC machines offer the precision to reliably and repeatedly produce parts to a desired shape and specification, and can produce the parts rapidly.

However, by their very nature, CNC machines perform their cutting operations relative to a nominal workpiece shape as designed. In reality, every real workpiece has an actual shape which is slightly different from the nominal design shape. In some types of workpieces, the variation between nominal and actual workpiece shape is inconsequential. However, in other types of workpieces, the variation between nominal and actual workpiece shape, and between the shapes of each individual actual workpiece, can be significant.

For example, some applications call for a CNC machine to mill or etch a shape onto the surface of a part. If the part is a cast or forged part, the actual shape of the surface may vary from part to part. In such applications, in order to etch the shape at a constant depth into the surface of the part, the actual shape of the surface must be known. Without knowing the actual surface shape and contour, the CNC machine may etch the shape too deeply in some places and/or not deeply enough in other places.

In light of the circumstances described above, there is a need for a robust and accurate technique for adapting CNC machine tool paths to actual workpiece shapes which may each be different.

SUMMARY

In accordance with the teachings of the present disclosure, a method for adapting a CNC machine tool path from a nominal workpiece shape to an actual workpiece shape is disclosed. The method includes defining a grid of feature points on a nominal workpiece shape, where the feature points encompass an area around the machine tool path but do not necessarily represent points on the machine tool path. A probe is used to detect locations of the feature points on an actual workpiece. A space mapping function is computed as a transformation from the nominal feature points to the actual feature points, and the function is applied to the nominal tool path to compute a new tool path. The new tool path is used by the CNC machine to operate on the actual workpiece. The feature points are used to characterize the three dimensional shape of the working surface of the actual workpiece, not just a curve or outline.

Additional features of the presently disclosed devices and methods will become apparent from the following description and appended claims, taken in conjunction with the accompanying drawings.

DETAILED DESCRIPTION OF THE EMBODIMENTS

The following discussion of the embodiments of the disclosure directed to a method and system for adaptive path generation for CNC machining is merely exemplary in nature, and is in no way intended to limit the disclosed devices and techniques or their applications or uses.

Computer Numerical Control (CNC) machines have been used for many years to automatically produce parts based on a Computer Aided Design (CAD) file or other data which defines the part shape. There are several different types of machines which may be numerically or digitally controlled—such as drills, lathes and milling machines. The discussion of CNC machines in this disclosure should be understood to include the aforementioned types of machines and any other type of machine tool which is automatically controlled by a computer or processor to perform a machining function according to a mathematical model or digital data file representing a shape.

CNC machines perform their cutting operations relative to a nominal workpiece shape according to the design. That is, the part being operated on has some nominal pre-machining shape, defined in a CAD system for example, and the machine tool path is computed based on that nominal shape. In reality, however, every real workpiece has an actual shape which may be slightly different from the nominal design shape. In some types of workpieces, the variation between nominal and actual workpiece shape is inconsequential. However, in other types of workpieces, the variation between nominal and actual workpiece shape, and between the shapes of each individual actual workpiece, can be significant.

Figure 1:
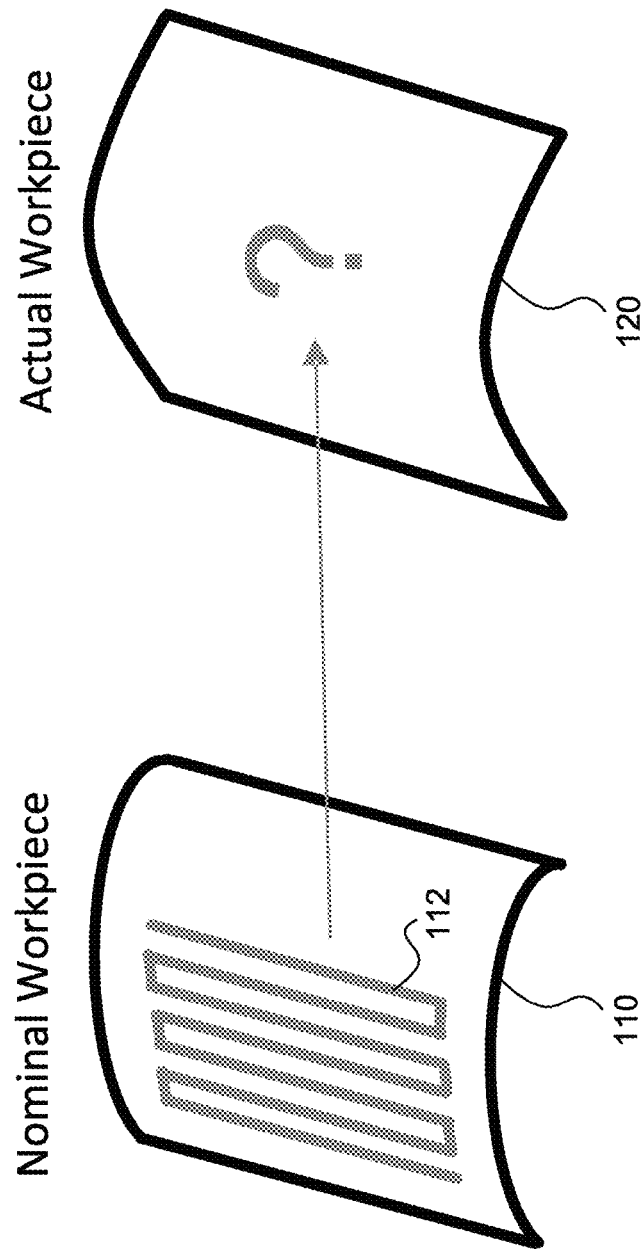
FIG. 1 is an illustration of what happens when a CNC machine tool path designed for a nominal workpiece shape is applied to an actual workpiece with a shape which differs from nominal.

FIG. 1 is an illustration of what happens when a CNC machine tool path designed for a nominal workpiece shape is applied to an actual workpiece with a shape which differs from nominal. A nominal workpiece 110 has a shape which is considered to be the standard or nominal shape. The nominal workpiece 110 may be an as-designed shape from a CAD model, or may be a measured shape of a prototype or production part which is considered to be nominal or "the benchmark". An actual workpiece 120 has a shape which is different from the nominal workpiece 110 in some way. In FIG. 1, it can be seen that the actual workpiece 120 has a cross-sectional curvature which is different than the nominal workpiece 110.

Consider an application where the task of the CNC machine is to mill or etch a pattern 112 onto an upper surface of a part represented by the nominal workpiece 110. Consider also that the pattern 112 is required to have a constant depth of cut into the surface of the part represented by the nominal workpiece 110. The CNC machine is programmed with a tool path which is based on the shape of the nominal workpiece 110. When this tool path is applied to the actual workpiece 120, the results will be completely unacceptable; some parts of the pattern 112 will have a depth which is too shallow or completely misses the actual workpiece 120, while other parts of the pattern 112 will have far too great a depth of cut. Many other scenarios can be envisioned where a CNC tool path based on a nominal workpiece shape will be unsatisfactory when applied to an actual workpiece shape. This is the problem which is solved by the techniques of the present disclosure.

Other known path adaptation techniques measure points along a perimeter of a part or along an intended tool path, fit a spline curve through the measured points on the actual part, and then attempt to estimate a contour of the actual part compared to the nominal part and compensate the tool path based on the offset. However, these techniques do not provide a comprehensive consideration of the entire work surface of the part, as they are based on interpolation of curves, not surfaces. Furthermore, these techniques require a large number of feature points along the length of the tool path in order to define a good quality spline curve.

Figure 2:
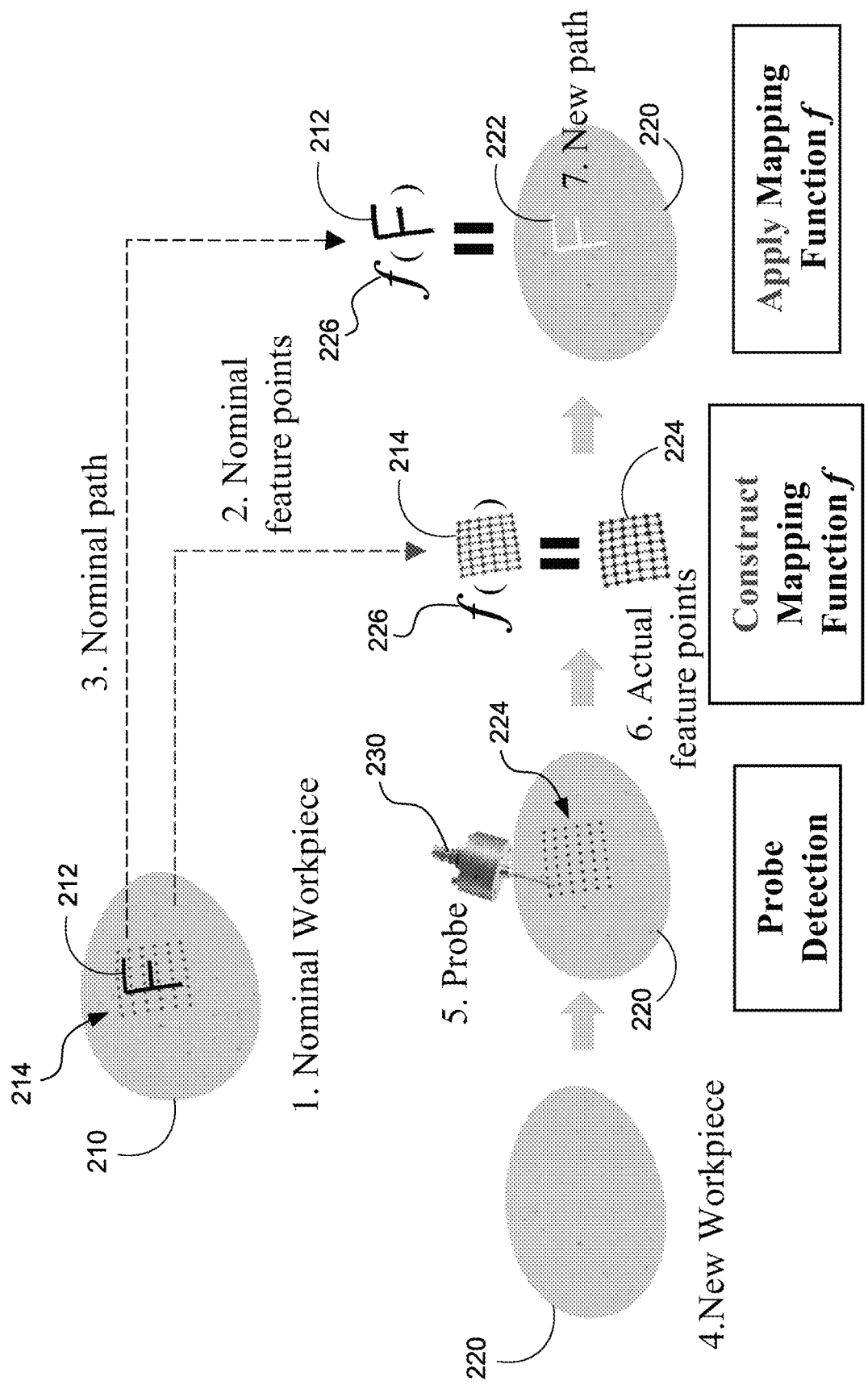
FIG. 2 is an illustration of a technique for adaptive path generation for CNC machining, according to an embodiment of the present disclosure.

FIG. 2 is an illustration of a technique for adaptive path generation for CNC machining, according to an embodiment of the present disclosure. In FIG. 2, eggs are used as metaphors for workpieces (such as molded or cast parts). The scenario of FIG. 2 is that a pattern is to be milled into the outer surface of an egg shell. The pattern obviously has to be milled at a very shallow and consistent depth in order to avoid breaking through the shell. Because the size and shape of each egg varies somewhat, it is clear that a CNC machine tool path cannot be defined based on one "nominal" egg and then applied satisfactorily to every other egg. Instead, according to the techniques of the present disclosure, the machine tool path is defined relative to a grid of measured feature points on the nominal egg, and then a corresponding grid of measured feature points on each actual egg is used to compute a space mapping function enabling an adjusted tool path to be calculated for each actual egg. Note that machining on an egg shell is only one example. The disclosed technology can be applied in general cases of part machining beyond this specific example.

A nominal workpiece 210 represents a part having a designated or theoretical size and shape, and is shown at step 1. A nominal tool path 212 is defined relative to the shape of the nominal workpiece 210. The nominal tool path 212 has a prescribed shape or pattern (in this example, a letter "F", of a certain size), and could have any suitable or desirable characteristic—such as a constant depth of cut into the surface of the nominal workpiece 210, a variable depth of cut, and/or a surface normal direction condition. A grid of nominal feature points 214 is defined in an area surrounding the nominal tool path 212, on the surface of the nominal workpiece 210. Individual feature points in the grid of nominal feature points 214 need not be superimposed on the nominal tool path 212; rather, it is simply required that the grid of nominal feature points 214 defines an area containing or encompassing the nominal tool path 212. The grid of nominal feature points 214 may have any dimensions suitable to achieve the desired machining accuracy. In the example shown in FIG. 2, a grid of 6×8 points is used. However, the grid of nominal feature points 214 may be square, rectangular or another shape as appropriate for properly fitting the nominal tool path 212. The grid of nominal feature points 214 are preferably fairly uniformly spaced, having approximately equal distances between points in rows and columns. In steps 2 and 3, the grid of nominal feature points 214 and the nominal tool path 212 are provided to the lower row of process steps for application to an actual workpiece.

A new workpiece 220 (step 4) is the part on which the machine tool is actually going to operate. The new workpiece 220 has a slightly different shape than the nominal workpiece 210; thus, a new tool path 222 must be calculated for the new workpiece 220. A probe 230 is used at step 5 to measure a grid of actual feature points 224 on the new workpiece 220. The probe 230 may be any suitable point location measuring device—such as a mechanical probe, a laser probe, or other type. The probe 230 may be part of the CNC machine. The probe 230 measures a three-dimensional location of each individual feature point in the grid of actual feature points 224. The overall location of the grid of actual feature points 224 may be established by any suitable means—such as a corner grid point or a central grid point having a location established relative to the two ends and the two side edges of the new workpiece 220, or a central grid point being located at a highest point on the new workpiece 220, where the new workpiece 220 is held in a fixture during the probe measurement. Rules for measuring the grid of actual feature points 224 may be established as appropriate—such as requiring that the probe 230 approaches each individual grid point in a direction normal to a local tangent plane in the known grid of nominal feature points 214.

After the grid of actual feature points 224 is measured, a mapping function f is constructed at step 6 which relates the grid of actual feature points 224 to the grid of nominal feature points 214. In other words, the function f is constructed to register two point sets in the space, such that f applied to each of the nominal feature points 214 is equal to or close to the corresponding one in the grid of actual feature points 224. The function f may be any suitable space mapping function which describes a mathematical relationship between a first surface patch (the grid of nominal feature points 214) and a second surface patch (the grid of actual feature points 224). For example, the function f may be a combination of several $1^{st}$, $2^{nd}$ or $3^{rd}$ order functions each defining the space mapping in a localized area of the grid of nominal/actual feature points, where each of the individual $1^{st}$, $2^{nd}$ or $3^{rd}$ order functions uses a subset of the points in the grid as input.

After being computed, the function f is applied (step 7) to the nominal tool path 212 to obtain the new tool path 222. It should be understood that both the nominal tool path 212 and the new tool path 222 are, in general, three dimensional shapes. That is, although the letter F of the nominal tool path 212 appears somewhat two dimensional in the figures, it is actually warped or wrapped to conform to the surface shape of the nominal workpiece 210. Likewise, the new tool path 222 is wrapped to conform to the surface shape of the new workpiece 220. Furthermore, the nominal tool path 212 and the new tool path 222 are modeled as discrete point sets, such that each point of the nominal tool path 212 can be plugged into the function f to obtain a corresponding point in the new tool path 222. After the new tool path 222 is calculated using the function f, the CNC machine performs the machining operation on the new workpiece 220 using the new tool path 222. Steps 4-7 of this process are repeated for each new actual workpiece.

In some embodiments, when the function f is applied to the nominal tool path 212 to obtain the new tool path 222, the new tool path 222 not only includes positions (x,y,z), but also includes tool orientation angle (such as yaw, pitch and roll or W,P,R rotations). The tool orientation angle differences may be significant for defining surface normalcy of the machined area, reducing tool vibration/chatter, and for other reasons. One technique for determining orientation angles is to use the location of neighbor points in the grid of actual feature points 224 to estimate a surface tangent plane and a surface normal direction for a particular grid point. The surface normal direction for each point in the grid of actual feature points 224 can then be applied to the new tool path 222, where the CNC machine tool can then be oriented to the surface normal direction for each point in the new tool path 222.

Figure 3:
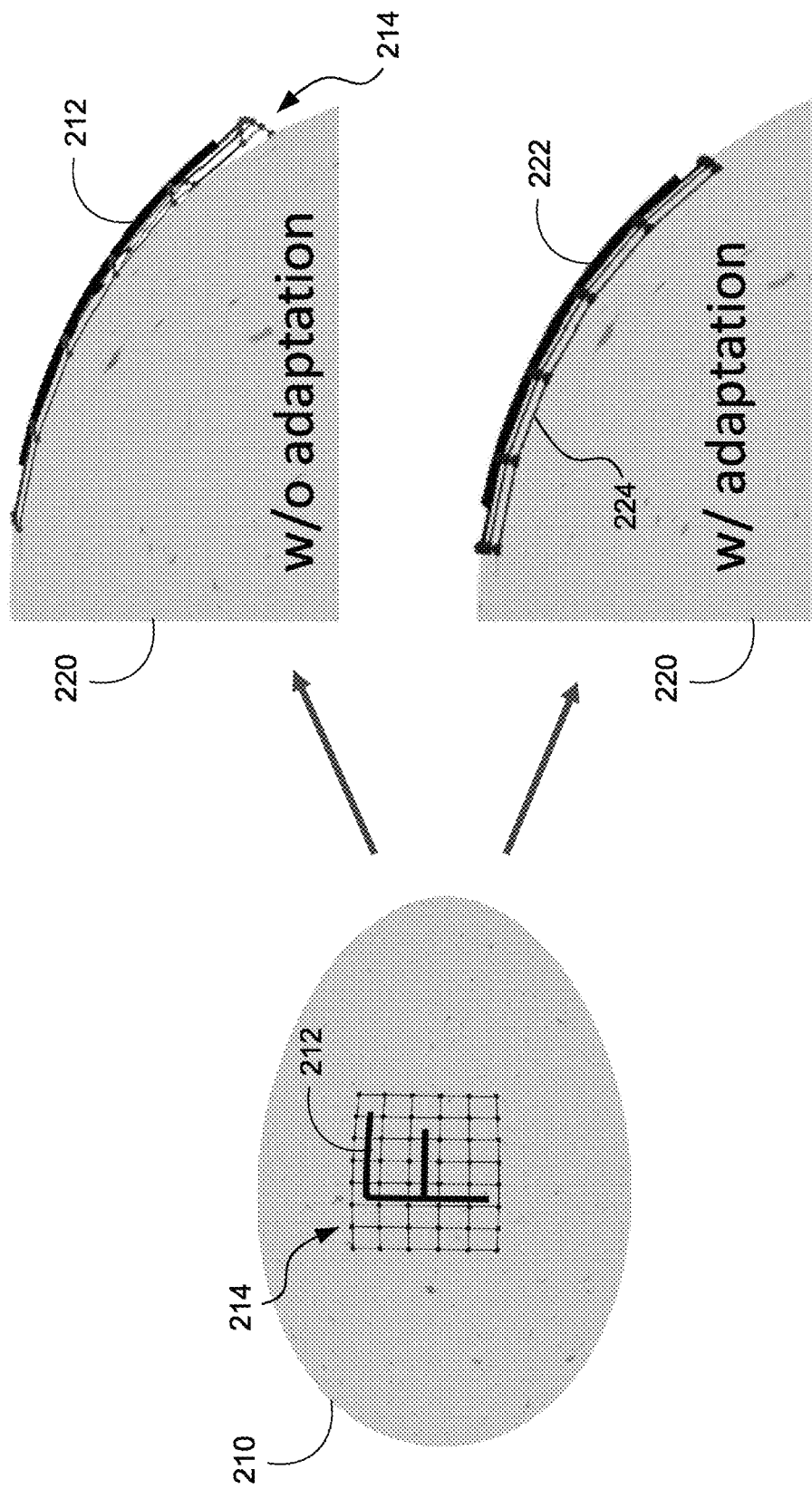
FIG. 3 is an illustration of a CNC machine tool path applied to an actual part which differs from a nominal part, without adaptation, and with adaptation according to an embodiment of the present disclosure.

FIG. 3 is an illustration of a CNC machine tool path applied to an actual part which differs from a nominal part, without adaptation, and with adaptation according to an embodiment of the present disclosure. The nominal workpiece 210 is shown at the left of FIG. 3, with the nominal tool path 212 and the grid of nominal feature points 214 as at step 1 of FIG. 2. At the right of FIG. 3, a portion of the new workpiece 220 is shown in a magnified view. At the upper right, the new workpiece 220 is shown with the nominal tool path 212 and the grid of nominal feature points 214 overlaid; that is, the grid of feature points and the tool path have not been adapted to the shape of the new workpiece 220. It can be seen that, without adaptation, the nominal tool path 212 and the grid of nominal feature points 214 both diverge from the surface of the new workpiece 220. If a CNC machine attempted to operate on the new workpiece 220 using the nominal tool path 212, it is clear that there would be no tool-workpiece contact for much of the operation. This is exactly the problem that the techniques of the present disclosure are designed to solve.

At the lower right of FIG. 3, the new workpiece 220 is shown with the new tool path 222 and the grid of actual feature points 224 overlaid; that is, the grid of feature points and the tool path have been adapted to the shape of the new workpiece 220. It can be seen that, with adaptation according to the present disclosure, the new tool path 222 and the grid of actual feature points 224 both faithfully follow the surface of the new workpiece 220. When the CNC machine operates on the new workpiece 220 using the new tool path 222, the tool will remain in contact with the surface of the new workpiece 220 for the entire operation, and the machining operation will provide the desired result (depth of cut, etc.) over the entire tool path. The new tool path 222, being properly fitted to the new workpiece 220, also results in improved surface finish quality and reduced tool vibration.

The adaptive tool path generation techniques disclosed above have been shown to work well on all types of nominal-to-actual part shape differences. These differences include: the two parts have the same characteristic shape but different curvature (i.e., the egg example); one part has a concave shape where the other part has a convex shape; different numbers of concave and convex regions (dips and humps) between one part and the other; and other types of arbitrary differences in shape between the surfaces of the nominal and actual parts in the area of the tool path. The disclosed adaptive tool path generation techniques can handle all of these types of part-to-part shape differences because a grid of points is used to characterize an entire surface, not just an outline or a single path.

Figure 4:
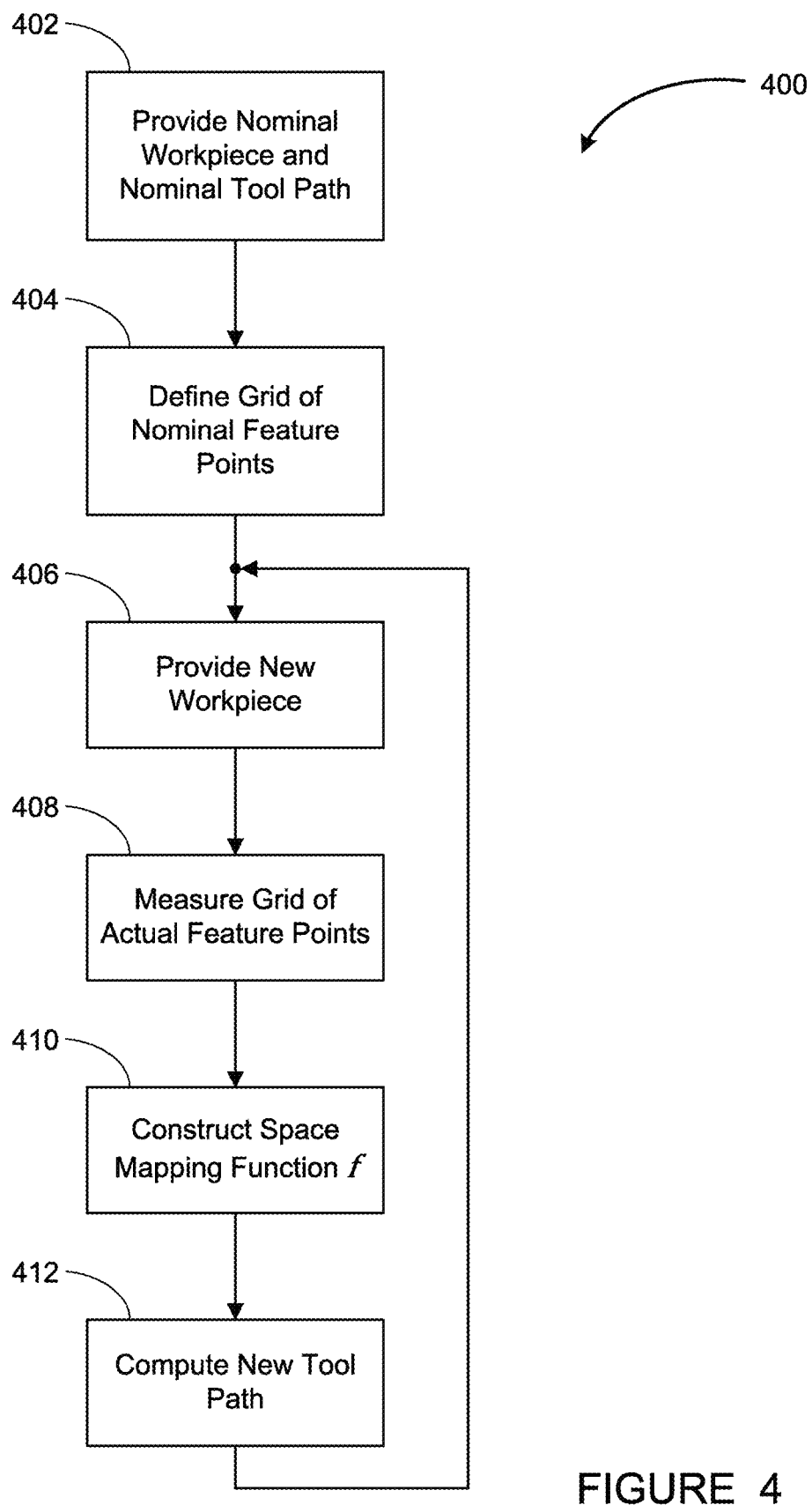
FIG. 4 is a flowchart diagram of a method for adaptive path generation for CNC machining, according to an embodiment of the present disclosure.

FIG. 4 is a flowchart diagram 400 of a method for adaptive path generation for CNC machining, according to an embodiment of the present disclosure. At box 402, a nominal workpiece is provided, along with a nominal tool path. The nominal tool path is designed to perform a desired operation on the nominal workpiece. At box 404, a grid of nominal feature points is defined on the surface of the nominal workpiece for an area surrounding the nominal tool path. The activities of the boxes 402 and 404 were shown at steps 1-3 of FIG. 2 and described in the corresponding discussion.

At box 406, a new workpiece is provided as shown at step 4 of FIG. 2, where the new workpiece is the actual part which is going to be operated upon by a CNC machine. At box 408, a grid of actual feature points is measured on the new workpiece by a probe, as shown at step 5 of FIG. 2 and described in the corresponding discussion. At box 410, a space mapping function f is constructed. As described in the discussion of step 6 of FIG. 2, the space mapping function f is a function which, when applied to the grid of nominal feature points (from the box 404), results in the grid of actual feature points (from the box 408). At box 412, a new tool path is computed by applying the space mapping function f to the nominal tool path. The new tool path is then used by the CNC machine to perform the machining operation on the new workpiece. The process of the flowchart diagram 400 then loops back to the box 406 where another new workpiece is provided. The nominal workpiece shape, the nominal tool path and the grid of nominal feature points are used as the baseline for all new/actual workpieces.

Figure 5:
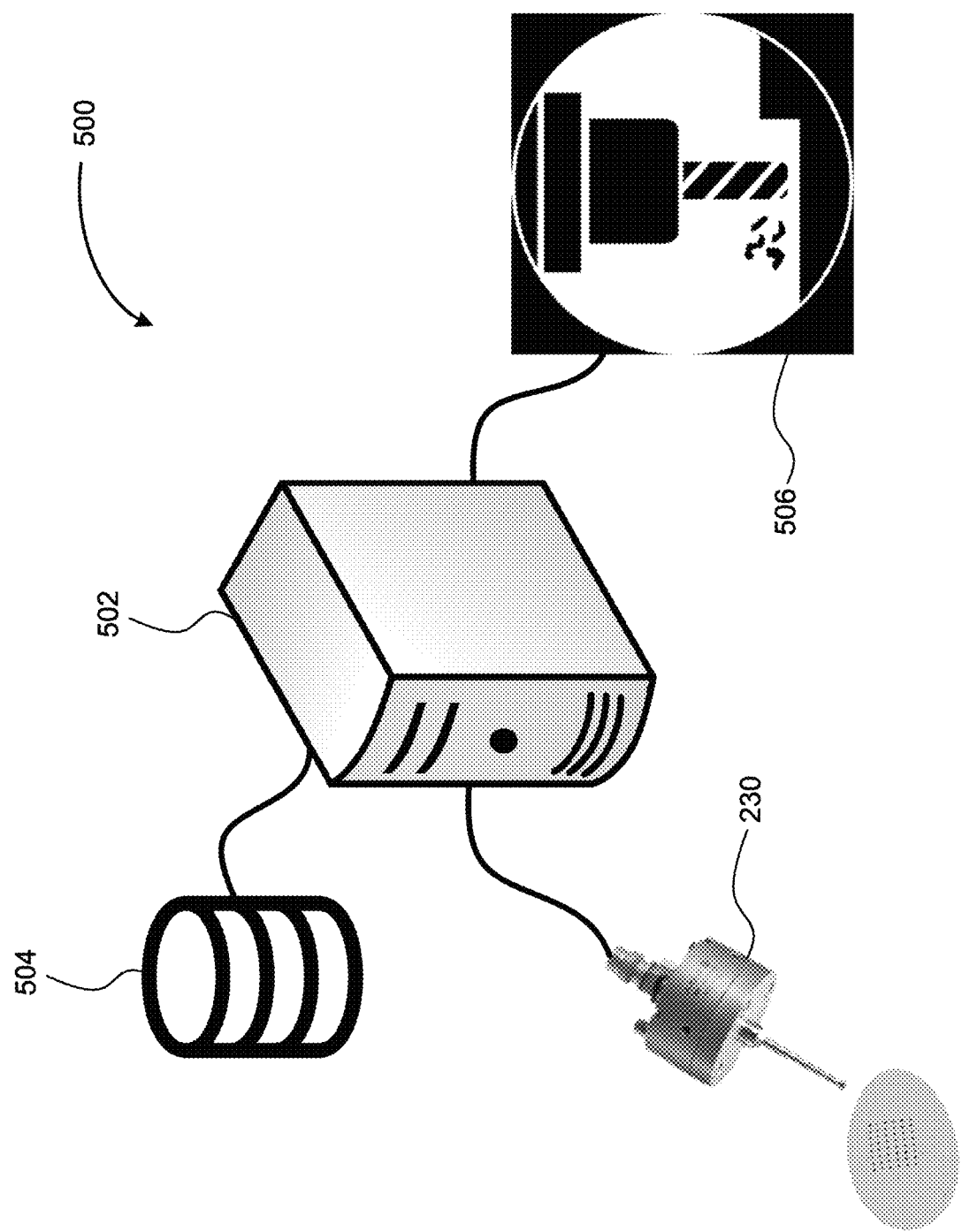
FIG. 5 is a schematic diagram of a system for adaptive path generation for CNC machining, according to an embodiment of the present disclosure.

FIG. 5 is a schematic diagram of a system 500 for adaptive path generation for CNC machining, according to an embodiment of the present disclosure. The system 500 includes at least one computer, controller, or server—represented by a computer 502. The computer 502 includes a processor and a memory 504, and is capable of receiving and storing data, performing calculations and optionally controlling a machine tool. The memory 504 contains data about the nominal workpiece as discussed previously—including the nominal path and the grid of nominal feature points shown at steps 1-3 of FIG. 2. The data about the nominal workpiece may be provided to the memory 504 of the computer 502 from a different computer such as a CAD system or a 3-D modeling system.

The system 500 also includes the probe 230 shown in FIG. 2 and discussed previously. The probe 230 may be a mechanical probe, a laser probe or other device capable of measuring multiple feature points on the actual/new workpiece. The probe 230 is in communication with the computer 502 and provides data defining the grid of actual feature points after said points are measured. The computer 502 performs the calculation or construction of the space mapping function f based on the grid of nominal feature points and the grid of actual feature points. The computer 502 also a computes a new tool path by applying the space mapping function f to the nominal tool path.

The system 500 may also include a CNC machine 506, which receives the new tool path from the computer 502 and performs the machining operation on the actual/new workpiece. The CNC machine 506 is not a required part of the adaptive path generation procedure of the present disclosure, per se, but rather receives the output of the adaptive path generation. As discussed earlier, the CNC machine 506 could be any type of CNC machine—such as a drill, a lathe or a milling machine—or any other type of machine tool which is automatically controlled by a computer or processor to perform a machining function according to a model or data file defining a tool path. In practice, the probe 230 may be part of the CNC machine 506, and the computer 502 may be the controller of the CNC machine 506.

In some implementations, the computer 502 may be multiple computers communicating on a network (wired or wireless). As would be understood by one skilled in the art, the several computing functions—including providing CAD data describing the nominal workpiece, controlling the probe 230, computing the space mapping function f and using f to compute the new tool path, and controlling the CNC machine 506—may be performed by any combination of one or more computing devices without changing the scope or nature of the presently disclosed techniques. These devices may be general purpose computers, customized controllers or processors, or any other computing device suitable for the purpose. In a preferred embodiment mentioned above, the computer 502 is a CNC machine controller; that is, data describing the nominal workpiece is provided to the CNC machine controller, the probe 230 is also part of the CNC machine 506 and provides its measurement data to the controller, and the CNC machine controller computes the space mapping function f and uses f to compute the new tool path.

As outlined above, the disclosed techniques for adaptive path generation for CNC machining improve the performance of machining operation for applications where part-to-part variations are significant or the machining operation is sensitive to even minor variations in part shapes.

While a number of exemplary aspects and embodiments of the method and system for adaptive path generation for CNC machining have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for adapting a machine tool path to an actual part shape, said method comprising:
   providing a nominal tool path defining a machining operation on a surface of a nominal workpiece;
   defining a grid of nominal feature points, where each of the nominal feature points lies on the surface of the nominal workpiece, and the grid of nominal feature points covers an area encompassing the nominal tool path;
   providing a new workpiece;
   measuring a grid of actual feature points on the new workpiece using a probe, where each of the actual feature points is measured by the probe by approaching a location of a corresponding nominal feature point in a direction normal to a local surface tangent plane, where the local surface tangent plane is determined from adjacent points in the grid of nominal feature points;
   constructing a space mapping function, using a computer having a processor and memory, where the space mapping function defines a spatial transformation from the grid of nominal feature points to the grid of actual feature points; and
   computing a new tool path, using the computer, by applying the space mapping function to the nominal tool path.

2. The method according to claim 1 wherein the nominal tool path and the grid of nominal feature points are defined in a computer-aided design system.

3. The method according to claim 1 wherein the probe is a mechanical probe or a laser probe.

4. The method according to claim 3 wherein the probe is part of a machine tool which performs the machining operation.

5. The method according to claim 4 wherein the computer is a controller of the machine tool which performs the machining operation.

6. The method according to claim 1 wherein the grid of actual feature points has the same number of rows and columns of points as the grid of nominal feature points.

7. The method according to claim 1 wherein the space mapping function specifies a mathematical relationship between points in the grid of nominal feature points and points in the grid of actual feature points, and where the space mapping function includes a plurality of individual functions of 1st, 2nd or 3rd order each defining space mapping in a localized area of the grids of nominal and actual feature points, where each of the individual functions uses a subset of the points in the grids as input.

8. The method according to claim 7 wherein the new tool path includes x, y and z positional differences from the nominal tool path and yaw, pitch and roll rotational differences from the nominal tool path.

9. The method according to claim 1 further comprising using the new tool path by a machine tool to perform the machining operation on the new workpiece.

10. The method according to claim 9 wherein the machine tool is a computer-controlled mill, drill or lathe.

11. A method for adapting a machine tool path to an actual part shape comprising defining a grid of nominal feature points on a surface of a nominal workpiece, said grid of nominal feature points covering an area encompassing a nominal tool path, measuring a grid of actual feature points on a new workpiece using a probe which approaches a location of a nominal feature point corresponding with each actual feature point in a direction normal to a local surface tangent plane which is determined from adjacent points in the grid of nominal feature points, constructing a space mapping function, using a computer having a processor and memory, where the space mapping function defines a spatial transformation from the grid of nominal feature points to the grid of actual feature points, and computing a new tool path by applying the space mapping function to the nominal tool path.

12. A system for adapting a machine tool path to an actual part shape, said system comprising:
   a measurement probe configured to measure locations of a grid of actual feature points on an actual workpiece; and
   a computer having a processor and memory, said computer being in communication with the probe and receiving the locations of the grid of actual feature points, said computer configured to construct a space mapping function which defines a spatial transformation from a grid of nominal feature points to the grid of actual feature points, the grid of nominal feature points being on a surface of a nominal workpiece and covering an area encompassing a nominal tool path, and compute a new tool path by applying the space mapping function to the nominal tool path, where each of the actual feature points is measured by the probe by approaching a location of a corresponding nominal feature point in a direction normal to a local surface tangent plane which is determined from adjacent points in the grid of nominal feature points.

13. The system according to claim 12 wherein the nominal tool path and the grid of nominal feature points are defined in a computer-aided design system and provided to the computer.

14. The system according to claim 12 wherein the measurement probe is a mechanical probe or a laser probe.

15. The system according to claim 12 wherein the grid of actual feature points has the same number of rows and columns of points as the grid of nominal feature points.

16. The system according to claim 12 wherein the space mapping function specifies a mathematical relationship between points in the grid of nominal feature points and points in the grid of actual feature points, and where the space mapping function includes a plurality of individual functions of 1st, 2nd or 3rd order each defining space mapping in a localized area of the grids of nominal and actual feature points, where each of the individual functions uses a subset of the points in the grids as input.

17. The system according to claim 16 wherein the new tool path includes x, y and z positional differences from the nominal tool path and yaw, pitch and roll rotational differences from the nominal tool path.

18. The system according to claim 12 wherein the probe and the computer are embodied in a machine tool which uses the new tool path to perform the machining operation on the actual workpiece, where the machine tool is a computer-controlled mill, drill or lathe.

\* \* \* \* \*